United States Patent [19]

Nakanishi

[11] Patent Number: 4,800,325
[45] Date of Patent: Jan. 24, 1989

[54] SPINDLE POSITIONING APPARATUS

[75] Inventor: Yoshinori Nakanishi, Numazu, Japan

[73] Assignee: Toshiba Kikai Kabushiki Kaisha, Tokyo, Japan

[21] Appl. No.: 3,281

[22] Filed: Jan. 14, 1987

[30] Foreign Application Priority Data

Jan. 17, 1986 [JP] Japan .................................. 61-6396

[51] Int. Cl.⁴ ............................................... G05B 1/06
[52] U.S. Cl. ...................................... 318/661; 318/605; 318/630
[58] Field of Search ............... 318/560, 567, 569, 571, 318/599, 616, 638, 652, 661, 600, 603, 605, 606, 608, 632, 630

[56] References Cited

U.S. PATENT DOCUMENTS

| | | | |
|---|---|---|---|
| 3,896,356 | 7/1975 | Hoffman et al. | 318/661 |
| 4,021,714 | 5/1977 | Jones et al. | 318/605 |
| 4,297,624 | 10/1981 | Komiya | 318/661 |
| 4,357,569 | 11/1982 | Iwakane et al. | 318/661 |
| 4,359,676 | 11/1982 | Fujioka | 318/571 |
| 4,379,987 | 4/1983 | Kohzai et al. | 318/571 |
| 4,529,922 | 7/1985 | Ono | 318/605 |
| 4,535,277 | 8/1985 | Kurakake | 318/616 |

FOREIGN PATENT DOCUMENTS 1032342 6/1966 United Kingdom .

Primary Examiner—William M. Shoop, Jr.
Assistant Examiner—David Martin
Attorney, Agent, or Firm—Birch, Stewart, Kolasch & Birch

[57] ABSTRACT

A spindle positioning apparatus for positioning the spindle of a machine tool, for example, includes an absolute angle detector such as a resolver operatively coupled to a spindle motor which drives the spindle, and an absolute position detector such as a resolver operatively coupled to the spindle. A position control processing system derives a positional error from detected signals from the absolute angle detector and the absolute position detector and a target position command signal.

11 Claims, 2 Drawing Sheets

SPINDLE POSITIONING APPARATUS

BACKGROUND OF THE INVENTION

The present invention relates to a spindle positioning apparatus for positioning the spindle of a machine tool with a high degree of accuracy while simplifying the structure of a speed reducer or the like associated with a spindle mechanism and facilitating complex machining operations.

Spindle controlling apparatus for machine tools are implemented by a highly sophisticated control system that has been achieved in recent years by the technical advance of computerized control. However, the prior spindle controlling apparatus suffer from disadvantages when positioning the spindle highly accurately at high speed in order to increase the machining efficiency.

FIG. 1 of the accompanying drawings illustrates in block form a conventional spindle positioning apparatus for use in a machine tool. A speed command A1 is applied to a contact X1 of a changeover switch 2 and delivered via a common contact X0 thereof to a speed command processor 4. The speed command processor 4 then effects an arithmetic operation to control the speed indicated by the applied speed command, and produces a torque command B1 as a result of the arithmetic operation. The torque command B1 is fed to a vector control processor 6 in which a vector arithmetic operation, a slip arithmetic operation, phase conversion, and the like are carried out for substantially controlling a spindle motor 10. The vector control processor 6 produces three-phase signals C1 through C3, which are applied to a three-phase PWM current control amplifier 8 that amplifies the power of the three-phase signals C1 through C3. The amplified signals C1 through C3 are then delivered as a driving current D1 to the spindle motor 10. The spindle motor 10 is coaxially coupled to a pulse generator 12 which generates a pulse train QM dependent on the rotational speed of the spindle motor 10.

The speed of rotation of the spindle motor 10 is reduced by a gear train (not shown) housed in a gear box 14 for rotating a spindle 16. The spindle 16 is coupled through a gear 18 to a position coder 20 that produces a position signal QF dependent on the rotational speed of the spindle 16. The pulse train QM from the pulse generator 12 is converted by a phase detector 22 to a phase signal QMP supplied to the vector control processor 6. The position signal QF, which is in the form of a pulse train, is applied to and converted by a position detector 26 to positional data QFP that is fed to both a zero settig circuit 28 and a subtractor 30. When the zero point for the positional data signal QFP is set, i.e., when the original position of the position coder 20 is confirmed, the zero setting circuit 28 supplies a reset signal to a flip-flop 32 coupled to the output terminal of the zero setting circuit 28.

The flip-flop 32 is supplied with a spindle positioning command S1 which is also applied to the changeover switch 2. In response to the spindle positioning command S1, the changeover switch 2 connects the common contact X0 to a contact X2, and the flip-flop 32 applies a set output SS to a changeover switch 34. Then, a common contact Y0 is connected to a contact Y1 in the changeover switch 34 to allow a low-speed command signal L1 to be applied via the changeover switches 34, 2 to the speed control processor 4. The subtracter 30 finds the difference between a position command signal PC1 and the positional data signal QFP, and applies a differential signal to a control amplifier 36 which effects a PI (proportional plus integral) control process to produce a speed command signal A0. The speed command signal A0 is then applied to a contact Y2 of the changeover switch 34.

Operation of the spindle positioning apparatus shown in FIG. 1 will be described below.

The spindle positioning apparatus has two operational modes. One of the operational modes is a speed control mode in which the machining operation of the machine tool is effected at a constant speed. The other operational mode is a positioning mode in which the spindle 16 is brought to a specified target position. In the speed control mode, the common contact X0 is connected to the contact X1 in the changeover switch 2, and the speed command A1 and speed data QMV from a speed detector 24, indicating the rotational speed of the spindle motor 10, are supplied to the speed control processor 4. The speed control processor 4 then calculates the difference between the speed command A1 and the speed data signal QMV and applies the torque command B1 representative of such difference to the vector control processor 6. The vector control processor 6 calculates, from the phase data signal QMP, the slip and current vector phase of the spindle motor 10 dependent on the torque command B1, and applies three-phase current commands C1 through C3 to the three-phase PWM current control amplifier 8. The three-phase PWM current control amplifier 8 amplifies the power of the three-phase current commands C1 through C3 and supplies a driving current D1 to the spindle motor 10. The rotative power from the spindle motor 10 is transmitted through the speed reducer gear train in the gear box 14 to the spindle 16 to rotate the same at the specified speed command A1.

When the spindle 16 is to be positioned under the above condition, the positioning mode is selected to apply the main positioning command S1 to the flip-flop 32 and the changeover switch 2 and also to apply the positioning command PC1 to the subtracter 30. At this time, the low-speed command signal S1 is also delivered to the changeover switch 34. The command contact Y0 is connected to the contact Y1 in the changeover switch 34, and the common contact X0 is connected to the contact X2 in the changeover switch 2.

In the positioning mode, the spindle motor 10 is initially rotated at a low speed according to the low-speed command signal L1 until the original position of the position coder 20 is detected. When the original position of the position coder 20 is confirmed by the zero setting circuit 28, the flip-flop 32 issues a set signal SS to the changeover switch 34 to connect the common contact Y0 to the cntact Y2, whereupon a speed command A0 is delivered via the changeover switches 34, 2 to the speed control processor 4. In the event that the position command signal PC1 and the positional data QFP indicative of the position of the spindle 16 coincide with each other, the spindle motor 10 is stopped, completing the positioning of the spindle 16.

With the spindle positioning apparatus of the above construction, there is a large detection timing difference due to backlash and lost motion between the pulse generator 12 coupled to the spindle motor 10 and the position coder 20 coupled to the spindle 16. Since such a detection timing difference is not compensated for, the positioning accuracy is low, and the force for locking the spindle in the specified position is relative small. In case an increment-type encoder is employed as the position coder 20, when the apparatus changes from the speed control mode to the positioning mode, the positioning process has to be started after rotating the spindle through one revolution or more in order to confirm the original position of the increment-type encoder, resulting in a large time loss. Such a time loss can be reduced by using an absolute-type encoder as the position coder 20, but the apparatus with an absolute-type encoder is expensive.

SUMMARY OF THE INVENTION

In view of the aforesaid drawbacks of the conventional spindle positioning apparatus, it is an object of the present invention to provide a spindle positioning apparatus capable of positioning a spindle highly accurately with a reduced time loss during positioning control.

Another object of the present invention is to provide a spindle positioning apparatus comprising an absolute angle detector operatively coupled to a spindle motor, a spindle drivable by the spindle motor, an aboslute position detector operatively coupled to the spindle, and a position control processing system for deriving a positional error from detected signals from the absolute angle detector and the absolute position detector and a target position command signal.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The above and other objects, features and advantages of the present invention will become more apparent from the following description when taken in conjunction with the accompanying drawings in which a preferred embodiment of the present invention is shown by way of illustrative example and is thus not limitative of the present invention, and wherein.

DETAILED DESCRIPTION OF THE PREFERRED EMBODIMENT

Figure 1:
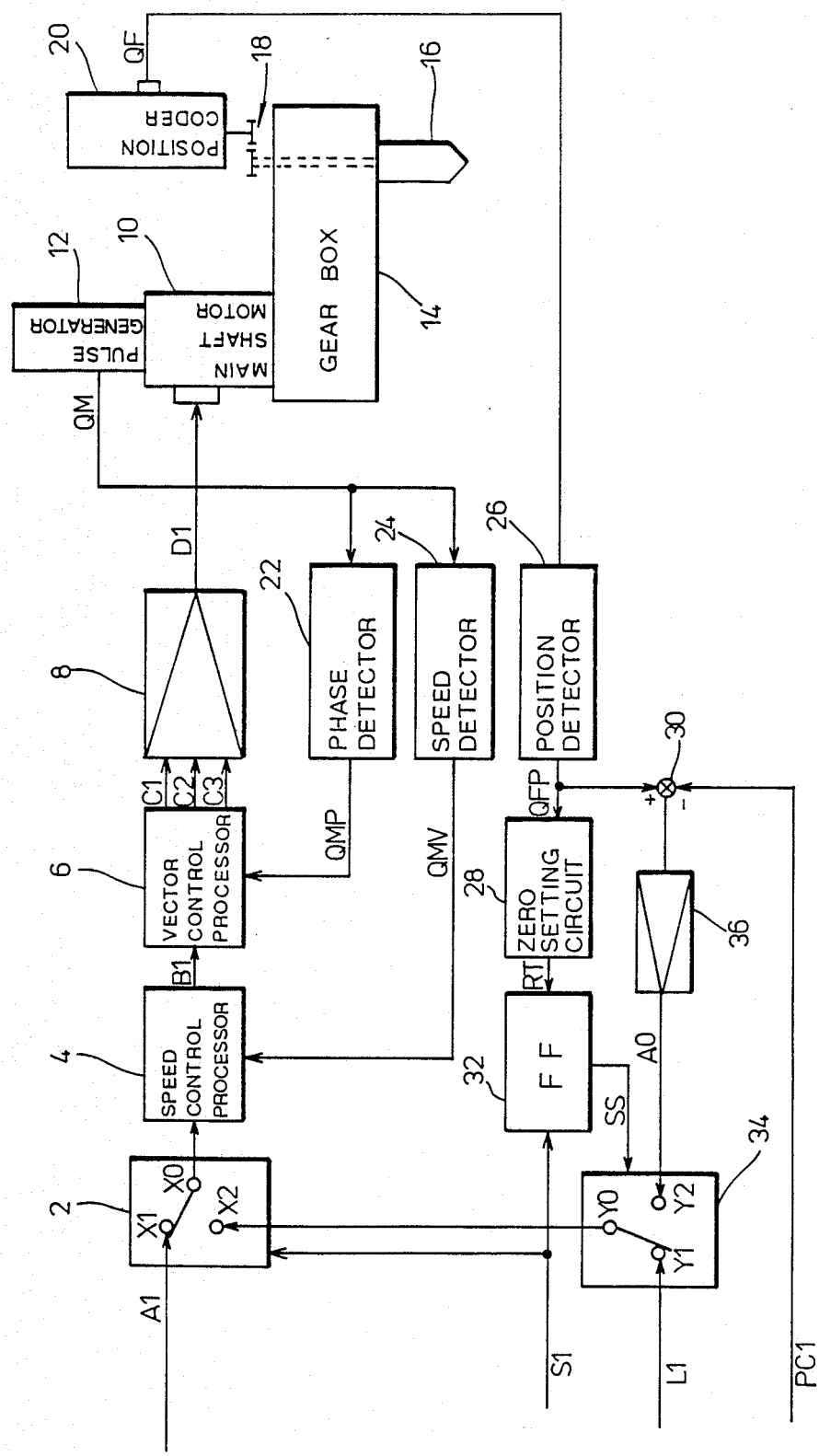
FIG. 1 is a block diagram of a conventional spindle positioning apparatus.
Figure 2:
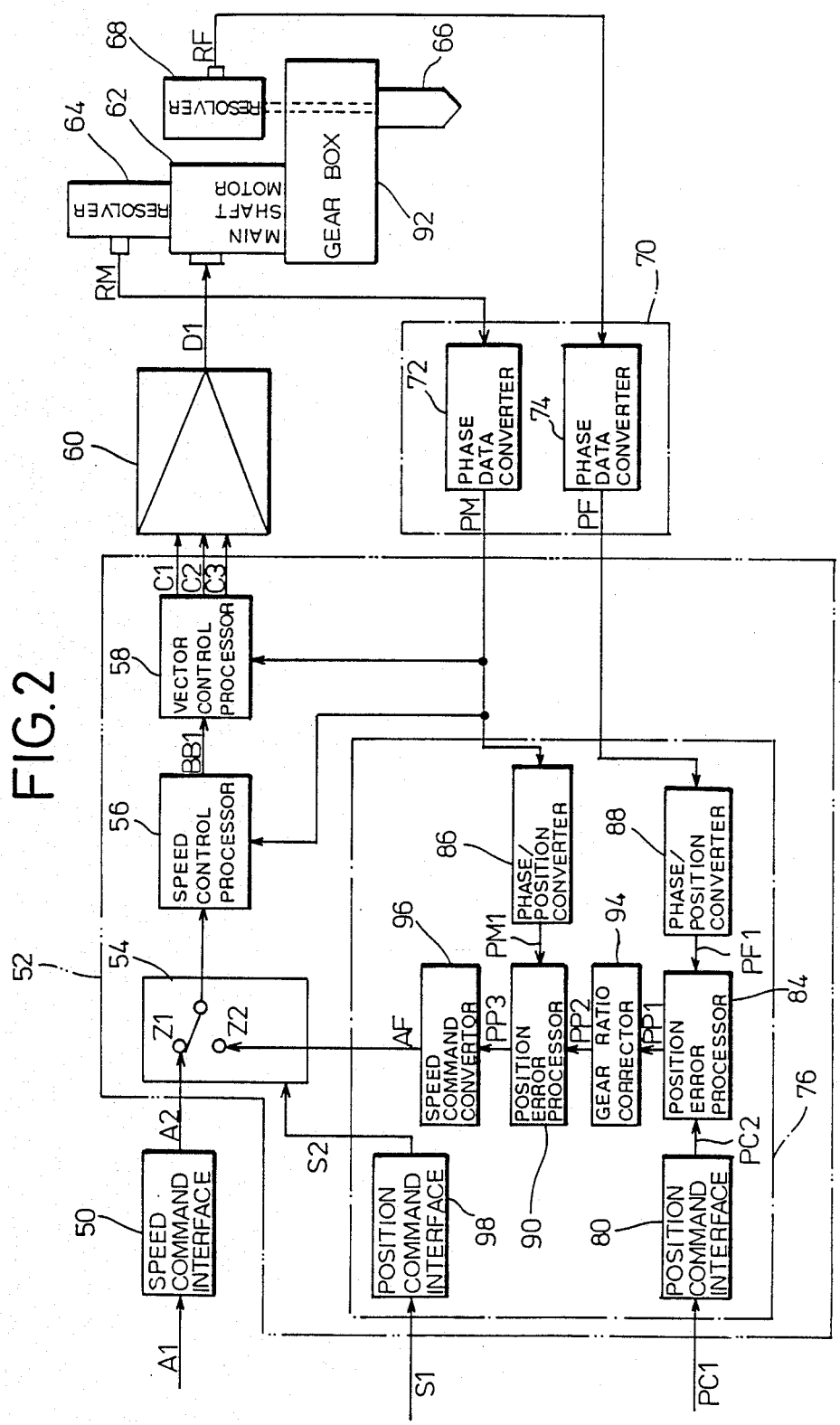
FIG. 2 is a block diagram of a spindle positioning apparatus according to the present invention.

Referring to FIG. 2, a speed command signal A1 is converted by a speed command interface 50 to digital speed command data A2 that can be processed for computerized control, and the digital speed command data A2 is applied to a CPU (central processing unit) 52. In the CPU 52, the digital speed command data A2 from the speed command interface 50 is fed via a changeover switch 54 to a speed control processor 56 in which a speed arithmetic operation is effected and a vector control processor 58 in which a vector arithmetic operation is carried out. The vector control processor 58 produces three-phase command signals C1 through C3 which are amplified by a three-phase PWM current control amplifier 60 to drive a spindle motor 62. The spindle motor 62 is coupled to an absolute angle detector 64 comprising a resolver, and a spindle 66 rotated by the spindle motor 62 is coupled to an absolute position detector 68 comprising a resolver. Output signals RM, RF from the resolvers 64, 68, respectively, are applied to a feedback processing unit 70. The feedback processing unit 70 comprises phase data converters 72, 74 for digitizing the output signals RM, RF, respectively. More specifically, phase difference signals indicative of phase differences between the exciting signals for the resolvers 64, 68 and signals from the secondaries thereof are converted by the phase data converters 72, 74 to respective digital signals, which are issued as phase data PM and phase data PF, respectively. The phase data PM and the phase data PF are applied to the CPU 52. In the CPU 52, the phase data PM is delivered to a hybrid position control processor 76, the speed control processor 56, and the vector control processor 58, while the phase data PF is delivered only to the hybrid position control processor 76. A spindle positioning command signal S1 and a position command signal PC1 are applied to the CPU 52 in which they are first supplied to the hybrid position control processor 76. In the hybrid position control processor 76, the spindle positioning command signal S1 is fed to a position command interface 98 which converts the signal S1 to a position command data signal S2 of a prescribed signal form, which is then delivered to the changeover switch 54. The position command data signal S2 serves to disconnect a common contact of the changeover switch 54 from a contact Z1 connected to the speed command interface 50 and to connect the common contact to a contact Z2. The position command signal PC1 is converted by a position command interface 80 to position command data PC2 which is fed to a position error processor 84. The phase data PM, PF are converted respectively by phase/position converters 86, 88 to position data PM1 and position data PF1, respectively, which are fed to position error processors 90, 84, respectively. The position data signal PF1 and the position command data PC2 are calculated in the position error processor 84 to produce position error data PP1, which is applied to a gear ratio corrector 94 in which an arithmetic operation is effected on the position error data PP1 with the gear ratio K of a gear train housed in a gear box 92 interposed between the spindle motor 62 and the spindle 66 being employed as a parameter. The gear ratio corrector 94 issues position correcting data PP2 to the position error processor 90 in which an error is calculated with respect to the position data signal PM1. Then, position error correcting data PP3 is applied by the position error processor 90 to a speed command converter 96 that converts the position error correcting data PP3 to a speed command signal AF, which is applied to the changeover switch 54.

The operation of the spindle positioning apparatus shown in FIG. 2 will now be described. The spindle positioning apparatus of the present invention has three operation modes. The first operation mode is a speed control mode in which the spindle 66 is driven to rotate at a specified constant speed. The second mode is a positioning mode in which the spindle 66 is brought to a specified target position. The third mode is a position holding mode in which the spindle 66 is held in the target position.

In the speed control mode, the changeover switch 54 selects the contact Z1, and the speed command signal A1 and the phase data signal PM indicative of the phase of the spindle motor 62 are fed to the speed control processor 56 for effecting a speed feedback arithmetic operation with respect to the spindle motor 62. As a result of the arithmetic operation thus carried out, the speed control processor 56 applies a torque command BB1 to the vector control processor 58 in which the slip and current vector of the spindle motor 62 are calculated from the phase data signal PM according to the torque command signal BB1, and which issues three-phase current command signals C1 through C3.

As illustrated in FIG. 2, the three-phase current command signals C1 through C3 are supplied to the three-phase PWM current control amplifier 60 which amplifies the applied signals and supplies a driving current D1 to the spindle motor 62. The spindle motor 62 is now rotated at a constant speed according to the specified speed command signal A1. When the spindle motor 62 starts to rotate at the constant speed, the speed of rotation of the spindle motor 62 is reduced at the gear ratio K of the gear train in the gear box 92, and the main shaft 66 is driven to rotate at a constant reduced speed.

When the spindle 66 is required to be positioned, the positioning mode is selected to apply the spindle positioning signal S1 and the position command signal PC1 to the hybrid position control processor 76. The changeover switch 54 now selects the contact Z2. The position error processor 84 then calculates a positional error of the position data PF1 with respect to the command position data PC1. Position error data PP1 produced by the position error processor 84 is employed in the gear ratio corrector 94 to calculate a target position for the spindle motor 62, using the gear ratio K of the gear train in the gear box 92. The target position thus calculated is applied as position correcting data PP2 to the position error processor 90 in which a positional error is calaculated between the target position and the position data PM1 for obtaining position error correcting data PP3. This position error correcting data PP3 is converted to speed command data AF that is applied to the speed control processor 56.

In the speed control processor 56, PI control and other arithmetic operations are carried out to issue a torque command BB1. Thus, as in the speed control mode, the spindle motor 62 is controlled to bring the spindle 66 to a position according to the position command signal PC1. Stated otherwise, a detection timing error due to the backlash and lost motion arising from the gears in the gear box 92 is fully corrected for positional control of the spindle 66.

Once the spindle 66 is positioned with respect to the position command signal PC1, the position holding mode is selected. In the position holding mode, positional control is effected while positional data PM1 produced at the time the positioning of the spindle motor 62 is completed in being employed as a positioning target position. More specifically, the position error data PP2 when the positioning is completed is fixed as a target value, and even when the spindle 66 is subjected to external forces tending to move the same, the spindle 66 is held in the commanded position by reactive forces imposed by the spindle motor 62.

The position holding mode is canceled by either issuance of a spindle positioning command or changing of modes. The resolvers 64, 68 may be directly coupled to or built in the spindle motor 62 and the spindle 66, respectively.

With the arrangement of the present invention, the spindle is positioned by a hybrid system taking into account the gear ratio, backlash, and lost motion of the gear train in the gear box, so that the spindle can be positioned highly accurately and the force for locking the spindle in the command position is relatively large. It is also possible to simplify the construction in the gear box or design the construction in the gear box with a high degree of freedom. Freedom of the machine tool for machining a workpiece in a complex process such as a boreing process can be increased. Since the absolute position of the spindle is detected at all times, no time loss is involved in switching to the positioning mode, and hence the time period required for machining a workpiece is shortened and the control sequence itself is simplified.

Although a certain preferred embodiment has been shown and described, it should be understood that many changes and modifications may be made therein without departing from the scope of the appended claims.

What is claimed is:

1. A spindle positioning apparatus comprising:
    an absolute angle detector operatively coupled to a spindle motor, said absolute angle detector comprising a first resolver;
    a spindle drivable by the spindle motor;
    an absolute position detector operatively coupled to said spindle, said absolute position detector comprising a second resolver; and
    a position control processing system for deriving a positional error from detected signals from said absolute angle detector and a target position command signal whereby said spindle can be accurately and quickly positioned, said position control processing system further comprising,
    a first position error processor for deriving a positional error of said spindle from a spindle position command signal and the detected signal from said absolute position detector and for generating a position error signal indicative of the position of said spindle; and
    a second position error processor for deriving a deviation between said spindle motor and said spindle from the detected signal from said absolute angle detector and from a signal based on said position error signal from said first position error processor.

2. The spindle positioning apparatus according to claim 1, further including a feedback processing unit comprising first and second phase data converters connected respectively to outputs of said first and second resolvers for converting analog output signals of said first and second resolvers to corresponding digital signals, which are applied to said position control processing system.

3. The spindle positioning apparatus according to claim 1, wherein said position control processing unit further includes a gear ratio corrector connected between said first and second position error processors for correcting the output signal from said first position error processor with a coefficient related to a gear ratio of a gear train interposed between said spindle motor and said spindle.

4. A method for controlling and positioning a spindle comprising the steps of:
    operating a spindle positioning system in one of three modes, the first mode being a speed control mode, the second mode being a positioning mode and the third mode being a position holding mode;
    selectively driving said spindle by a motor;
    generating a speed command signal;

generating phase data signals indicative of a phase of the motor and a phase of the spindle;

generating a positioning signal;

generating a position command signal;

feeding said speed command signal, phase data signals, positioning signal and position command signal to a control unit;

using said speed command signal and a portion of said phase data signals in said control unit when operating in said first mode, said portion of said phase data signals being indicative of the phase of the motor;

generating command signals from said control unit in response to at least said using said speed command signal and a portion of said phase data signals;

supplying a driving current to said motor from a current control device in response to at least said command signals whereby said motor will be rotated at a constant speed when operating in said first mode;

using said positioning signal, said position command signal and said phase data signals in said control unit when operating in said second mode, said using said positioning signal, said position command signal and said phase data signals further comprising the steps of, calculating a positional error based on a portion of said phase data signals and said position command signal and generating a positional error signal in response thereto, said position of said phase data signals being indicative of the phase of said spindle, calculating position correction data based at least on said positional error signal and a portion of said phase data signals and generating a position correction data signal in response thereto, said portion of said phase data signals being indicative of the phase of the motor, and converting said position correction data signal to a modified speed command data signal;

sending said modified speed command data signal to said current control device when operating in said second mode;

modifying the current supplied to the motor by said current control device in response to said modified speed command data signal for causing the motor to rotate said spindle to a position responsive to said positioning signal when operating in said second mode; and fixing an output associated with said positional error signal at a target value when operating in said third mode whereby external forces tending to rotate said spindle will be countered by reactive forces from said motor to thereby hold said spindle in position.

5. The method for controlling and positioning as recited in claim 4, wherein said using the positioning signal, said position command signal and said phase data signals in said control unit when operating in said second mode further comprises the step of calculating a target position based on the positional error signal and a gear ratio of a gear train data being based on said target position which is ultimately based on at least said positional error signal whereby detection timing error due to backlash and lost motion arising from gears in said gear train can be corrected wherein said fixing uses said target position as said output associated with said positional error signal to thereby fix said target position at said target value.

6. The method for controlling and positioning as recited in claim 5, wherein said using said speed command signal and a portion of said phase data signals in said control unit when operating in said first mode further comprises the steps of:

calculating a slip and current vector of said motor from said phase data signals and generating a drive correction signal in response thereto; and altering said command signals in response to said drive correction signal to permit rotation of said spindle at a constant speed.

7. The method for controlling and positioning as recited in claim 5, wherein said supplying a driving current to said motor further comprises the steps of:

commencing rotation of said motor and said spindle by starting supply of current to said motor;

attaining a desired speed of rotation for said motor and said spindle; and reducing a gear ratio of said gear train for said motor whereby speed of rotation of said motor can be reduced to a constant lower speed while said spindle continues to rotate at said desired speed of rotation.

8. A spindle positioning apparatus comprising:

an absolute angle detector operatively coupled to a spindle motor;

a spindle drivable by the spindle motor;

an absolute position detector operatively coupled to said spindle; and a position control processing system for deriving a positional error from detected signals from said absolute angle detector and said absolute position detector and a target position command signal, wherein said position control processing system has a first position error processor for deriving a positional error of said spindle from a spindle position command signal and the detected signal from said absolute position detector, indicative of the position of said spindle, and a second position error processor for deriving a deviation between said spindle motor and said spindle from the detected signal from said absolute angle detector and an output signal from said position error processor.

9. A spindle positioning apparatus according to claim 8, wherein said absolute angle detector comprises a first resolver and said absolute position detector comprises a second revolver.

10. A spindle positioning apparatus according to claim 9, further including a feedback processing unit comprising first and second phase data converters connected respectively to outputs of said first and second resolvers for converting analog output signals of said first and second resolvers to corresponding digital signals, which are applied to said position control processing system.

11. A spindle positioning apparatus according to claim 8, wherein said position control processing unit further includes a gear ratio corrector connected between said first and second position error processor for correcting the output signal from said first position error processor with a coefficient related to a gear ratio of a gear train interposed between said spindle motor and said spindle.

* * * * *